G. HARPER.
NUT LOCK.
APPLICATION FILED JAN. 3, 1910. RENEWED SEPT. 21, 1910.
990,732.
Patented Apr. 25, 1911.
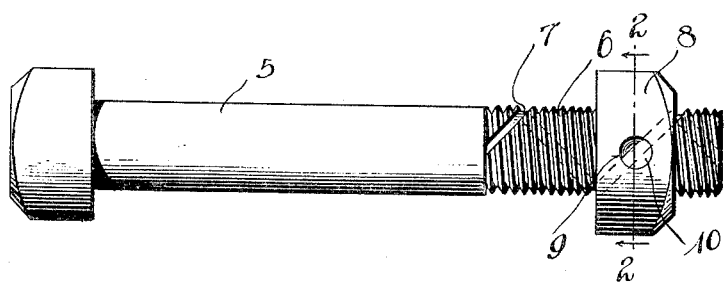
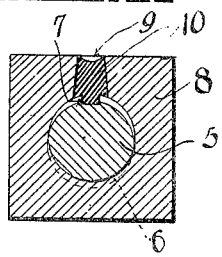
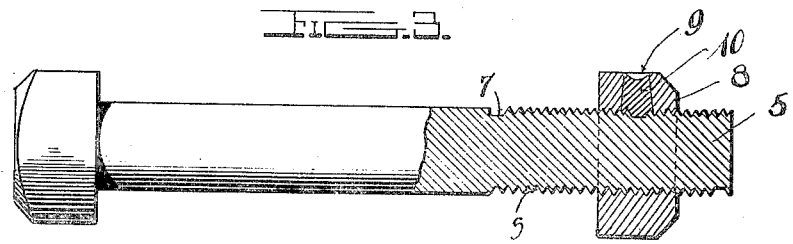
Inventor
George Harper.
Witnesses
By
Attorneys

UNITED STATES PATENT OFFICE.

GEORGE HARPER, OF GILMORE, MARYLAND, ASSIGNOR OF ONE-HALF TO MATHEW MARTIN, OF GILMORE, MARYLAND.

NUT-LOCK.

990,732. Specification of Letters Patent. Patented Apr. 25, 1911.

Application filed January 3, 1910, Serial No. 535,940. Renewed September 21, 1910. Serial No. 583,123.

*To all whom it may concern:*

Be it known that I, GEORGE HARPER, a citizen of the United States, residing at Gilmore, in the county of Allegany, State of Maryland, have invented certain new and useful Improvements in Nut-Locks; and I do hereby declare the following to be a full, clear, and exact description of the invention, such as will enable others skilled in the art to which it appertains to make and use the same.

This invention relates to locking means for nuts and has for its object to provide a nut which may be used in connection with a longitudinally channeled bolt and which nut, while of a size and a material to resist the usual stresses may be subjected in part to a hammer blow either direct or through the medium of a punch to lock it securely against removal under ordinary loosening influences.

A further object of the invention is to provide in the above mentioned connection, such an arrangement of a single channel as will permit of the adjustment of the nut from one locking position to another through an angular distance of less than (360 degrees) three hundred and sixty degrees.

A still further object of the invention is the provision of a nut lock which is simple in construction, thoroughly reliable and efficient in operation, and inexpensive in the manufacture.

With these and other objects in view, the invention consists in the construction, combination, and arrangement of parts as will be hereinafter more fully described in detail, illustrated in the accompanying drawings, which disclose the preferred form of embodiment of the invention, to enable those skilled in the art to practice the invention, and as pointed out in the claims hereunto appended.

In the drawings:—Figure 1 is a side elevation of a lock nut constructed in accordance with the invention. Fig. 2 is a sectional view on the line 2—2 of Fig. 1. Fig. 3 is a longitudinal sectional view through the bolt and nut.

Similar reference characters indicate corresponding parts throughout the several views in the drawings.

Referring to the drawings by numerals, 5 designates a headed bolt of the ordinary well known construction with its stem provided with screw threads 6, extending from the free end of the stem inward toward the head for a portion of the length of said stem.

Intersecting the thread 6, and formed in the stem or shank of the bolt 5, is a helically arranged channel 7, the latter being directed opposite to the trend of the threads 6, for the purpose as will be hereinafter more fully described.

Upon the stem or shank of the bolt 5, is mounted a rotatable nut 8, the latter being internally screw threaded in the ordinary manner to turn upon the threads 6, on said stem or shank of the bolt. The nut 8, is provided with a transverse opening 9, which communicates with the central threaded opening receiving the stem or shank of the bolt, and the wall of this opening 9, tapers outward from the central opening in the nut toward one side face thereof. Within the opening 9, in the nut 8, is introduced a filling 10, of a metal different from that of the nut and susceptible of flow into the threads 6, and channel 7, in the stem or shank of the bolt when the said metal filling 10, is delivered a blow or blows from a hammer, punch, or other suitable tool upon its outer surface and under the influence of such blow or blows to the filling 10, the nut 8, is securely fastened upon the bolt so that it will be held against removal under ordinary loosening influences.

It is obvious that the particular disposition of the channel 7, in the stem of the bolt will permit of adjustment of the bolt from one locking position to another through an angular distance of less than (360 degrees) three hundred and sixty degrees and in this manner a more positive and accurate adjustment is attained.

What is claimed is:—

1. The combination with a bolt having a channel intersecting its threads and progressing helically in a direction opposite to that of the threads, of a nut having a central threaded opening and a transverse opening communicating with its central opening, and a filling in the transverse opening of a metal different from that of the nut and susceptible of flow into the threads and helical channel of the bolt under the influence of hammer blows upon its outer surface.

2. The combination with a bolt having a channel intersecting its threads, of a nut having a central opening and a transverse opening communicating with its central opening, and a filling in the transverse opening of a metal different from that of the nut and susceptible of flow into the threads and channel of the bolt under the influence of hammer blows upon its outer surface.

In testimony whereof, I affix my signature, in presence of two witnesses.

GEORGE HARPER.

Witnesses:
JOHN J. MARTIN,
WILLIAM H. MARTIN.